United States Patent Office 2,975,063
Patented Mar. 14, 1961

2,975,063
COCOA-BUTTER SUBSTITUTES, PROCESS OF PREPARING SAME, AND COMPOSITION CONTAINING SAID SUBSTITUTES

Stanley Paul, Prenton, Birkenhead, and Antony Crossley, Bromborough, England, assignors to Lever Brothers Company, New York, N.Y., a corporation of Maine No Drawing. Filed Aug. 7, 1957, Ser. No. 676,710

Claims priority, application Great Britain Aug. 10, 1956

21 Claims. (Cl. 99—118)

This invention relates to cocoa-butter substitutes and to products containing them.

The main use of cocoa-butter is in chocolate. In the manufacture of good quality chocolate, the "nib," or decorticated cocoa bean, is ground and to it are added sugar, flavourings and additional cocoa-butter, together with milk powder in the case of milk chocolate. The amount of additionl cocoa-butter depends upon the type of chocolate and is usually between 25% and 100% of the amount of cocoa-butter already present in the ground "nib." The cocoa-butter content of such chocolate is largely responsible for its physical characteristics; cocoa-butter is unusual among naturally-occurring fats in that it is normally a brittle solid up to about 25° C., has a relatively narrow melting range and is almost completely liquid at 35° C.

Cocoa-butter is expensive and many attempts have been made to find a cheaper fat to substitute for at least part of the cocoa-butter which is added to the ground "nib." In addition, attempts have been made to find a fat which can be used to make chocolate from partly or completely defatted cocoa.

The present invention is based on the discovery that certain fractions obtained from partly-hardened palm oil can be used as partial or complete substitutes for cocoa-butter in chocolate, and also in other products in which cocoa-butter is normally used, for example, couvertures for confectionery.

The present invention comprises cocoa-butter substitutes derived from partly-hardened palm oil and having an iodine value not greater than 45, and preferably not greater than 42, a dilatation at 20° C. of not less than 1000, and a dilatation at 35° C. of not greater than 600. (All references in this specification to dilatations are to be construed as measured by the method described below.)

The invention also includes a process of preparing a cocoa-butter substitute which comprises partly hardening palm oil and fractionating the partly-hardened oil to obtain a fraction having an iodine value not greater than 45, and preferably not greater than 42, a dilatation at 20° C. of not less than 1000, and a dilatation at 35° C. of not greater than 600.

The invention also includes a process of preparing products in which cocoa-butter is normally incorporated, characterised in that at least part of the cocoa-butter is replaced by a fraction derived from partly-hardened palm oil and having an iodine value not greater than 45, and preferably not greater than 42, a dilatation at 20° C. of not less than 1000, and a dilatation at 35° C. of not greater than 600.

The process for which any particular fraction of partly-hardened palm oil according to the invention may be used will depend upon its iodine value and dilatations. Factors to be considered are the type of product in which the fraction is to be used, the desired quality of that product, and the degree of replacement of cocoa-butter by the fraction. For example, when used in chocolate as a substitute for a high proportion or substantially all of the cocoa-butter normally present, it is necessary that the dilatation at 20° C. of the fraction should be high enough to provide the physical characteristics, such as "snap," required in the chocolate. In addition, the fraction should have melted substantially completely at body temperature. When used to replace lower proportions of cocoa-butter, the dilatation at 20° C. can be lower, and complete melting of the fraction at body temperature is not essential.

When used to replace, for example, substantially all of the cocoa-butter normally present in chocolate the dilatation at 20° C. of the partly-hardened palm oil fraction according to the invention should be at least 1750 and the dilatation at 35° C. should not be greater than 200. When used to replace, for example, half the cocoa-butter normally present, useful results may be obtained with a dilatation at 20° C. of not less than 1500 and a dilatation at 35° C. of not greater than 300, whilst, for example, when used to replace about 25 percent by weight of the cocoa-butter normally present, fractions having a dilatation at 20° C. of not less than 1100 and a dilatation at 35° C. of not greater than 400 may be used.

The most generally useful fractions according to the invention are those having an iodine value within the range of 30 to 40, preferably not greater than 35, a dilatation at 20° C. of not less than 1500, preferably not less than 1750, and a dilatation at 35° C. of not greater than 300, preferably not greater than 200.

The fractions from hardened palm oil can be mixed with cocoa-butter prior to incorporation in, for example, chocolate and the invention includes mixtures of cocoa-butter and a fraction having the characteristics set out above.

The extent to which the palm oil, from which the fractions are to be derived, is hardened will depend to a large extent on the properties required in the fraction. Normally the oil will be hardened to an iodine value of not less than 10, and preferably not less than 25. The hardening should preferably be carried out under conditions which tend to minimise the formation of iso-oleic acids, for example, by using comparatively low temperatures, for example, below 120° C., and highly active sulphur-free catalysts. However, catalysts which have been poisoned, at least to some extent, with, for example, sulphur may also be used to harden the palm oil.

To obtain the fractions according to the invention from partly-hardened palm oil, it is necessary to remove either a high-melting or a low-melting fraction, or both, depending upon the degree of hydrogenation of the palm oil, the conditions used for the hydrogenation (the presence of substantial amounts of glycerides containing iso-oleic acids will tend to give the product to high a dilatation at 35° C.), and the properties required in the fraction. The iodine value and dilatations of the hardened palm oil will indicate whether a substantial high-melting fraction or a substantial low-melting fraction has to be removed in order to obtain, or move towards, a fraction according to the invention. The iodine value and dilatations of the product obtained after such removal will show what, if any, further fractions need to be removed. In order to obtain the preferred fractions according to the invention, it will normally be necessary to remove both high and low melting fractions from the hardened palm oil.

The fractionation may be carried out most conveniently from a solvent. In the following description of fractionation procedure, substantially anhydrous acetone is used as the solvent, but other substantially anhydrous solvents, for example, ether or light petroleum may be used, with suitable modification of proportions and conditions which may be readily determined. To remove any particular fraction a single crystallisation may suffice, but it may be advantageous to carry it out in two or more stages.

In order to remove the low-melting glyceride fraction in a single crystallisation, an amount of acetone between 3 and 10 mls. per gram of fat can be used. This amount of acetone can be reduced if the number of crystallisations is increased, or if a large number of washes is used. The temperature of crystallisation depends on the conditions used, in particular the solvent ratio. With ratios of the order given, temperatures of about −3° C. to about 6° C. may be used.

Various cooling procedures may be used. The oil may be dissolved in acetone at 15° C. or higher and then the solution cooled to the desired temperature. The solution may be allowed to cool undisturbed, but the time required is shortened considerably (20–30 minutes instead of many hours) if it is stirred throughout. Cooling may also be effected by distilling off part of the solvent under reduced pressure. An alternative procedure is to mix cold acetone with hot oil, the temperatures of these being such that the mixture is at the desired crystallisation temperature.

All crystallisations are preferably left at the crystallisation temperature until no further precipitation takes place. The precipitate may then be filtered off, preferably with the application of vacuum or pressure and then washed, either on or after removal from the filter, with chilled acetone at a temperature 1–2° C. lower than the crystallisation temperature.

An alternative procedure which has been found particularly satisfactory is to draw off the mother liquor and washing liquids instead of filtering. In order to obtain crystals in a suitable form for this procedure, the oil-in-acetone solution should be above 30° C. before cooling commences and stirring should be carried out throughout the cooling. Under these conditions the crystals settle rapidly and the mother liquor can be drawn off. The degree of removal of the low-melting fractions from the solid crystals will depend on the number of washes, but normally 4 to 6 will be sufficient. After each wash the wash liquor is drawn off, and can conveniently be used for crystallisation of the next batch of oil.

The removal of a high-melting glyceride fraction can be carried out by means of similar techniques, the ratio of acetone to oil being preferably in the range of 4 to 20 mls. per gram of oil and the crystallisation temperature in the range of 15 to 30° C. Where both high and low-melting fractions are to be removed either can be carried out first.

Refining of the product may be carried out at any stage, i.e. either before hydrogenation or before or after fractionation.

It has also been found that the usefulness of the fractions derived from hardened palm oil according to the invention can be increased by mixing them with certain fats other than cocoa-butter, in particular Borneo tallow, and the invention includes mixtures of these fats, described more particularly below, with the fractions of hardened palm oil.

These addition fats are characterised by a high content, preferably 60–70% or more, of tri-glycerides containing one unsaturated fatty acid radical in the 2-(or β) position in the glyceride and two saturated fatty acid radicals in the remaining positions. The unsaturated fatty acid radicals should be substantially wholly derived from the normal cis-form of 9:10-oleic acid. The saturated fatty acid radicals should be derived from stearic acid or a mixture of stearic and palmitic acids containing at least 50% and preferably about 75% of stearic acid. The remainder of the fat is preferably diunsaturated glycerides, with, at the most, a few percent of trisaturated glycerides and only very small amounts of triunsaturated glycerides. Such fats are hereinafter called "Borneo tallow type fats."

The naturally-occurring vegetable fats which fulfil the requirements set out above are Borneo tallow (commonly marketed under the name "Illipe Butter"), which is generally derived from *Shorea robusta* and *Shorea stenoptera*, fats derived from *Allanblackia floribunda*, *Allanblackia stuhlmannii*, *Garcinia indica*, *Pentadesma butyracea*, or *Palaquium oleosum*, and fat fractions derived from Butyrospermum parkii.

The proportions in which these fats may be added to the fraction of hardened palm oil will depend upon the nature of the fat and the particular fraction used. The minimum proportion will normally, however, be about 20% by weight of the mixture, but higher proportions, for example, 50–75% or more may be used.

In the melting of fats a characteristic change of volume is observed which, especially in the case of fats solid at the normal temperature, manifests itself in a sudden increase in the volume.

The dilatation or isothermal melting expansion of a fat is the volume increase, which is expressed in $mm.^3$, determined under the conditions of the following procedure and referred to 25 g., the reference temperature being given.

The dilatometer is of glass and consists of a vertical graduated capillary tube joined at its lower end by a U-shaped capillary tube to a glass bulb surmounted by a neck which is internally ground to take a hollow ground glass stopper. The height (above the lowest point of the U-shaped capillary) of the top of the graduated tube and the top of the mouth of the bulb are 350 mm. and 70 mm. respectively. The graduations extend over a length of 250 to 290 mm., and start 1 cm. from the upper end of the tube. The graduations are marked in intervals of 5 $mm.^3$ (accurately calibrated) and cover a total volume of 900 $mm.^3$. The internal diameter of the bulb is 20 mm. and it has a volume of 7 ml. (tolerance±0.5 ml.). The internally ground neck of the bulb tapers downwards from an internal diameter of 15 mm. to an internal diameter of 12 mm. and is 26 mm. long. The bulb of the instrument is thus below the level of the graduations on the capillary tubing. The stopper to be inserted in the mouth of the bulb is about 95 mm. in length (including the ground portion), and is hollow and is partly filled with lead shot to hold it firmly in position while a dilatation is being determined.

1.5 ml. of well boiled distilled water containing a little blue ink is pipetted into the bulb of the dilatometer. The dilatometer is then weighed. A sample of the fat to be examined is thoroughly de-gassed by heating at 100° C. under vacuum. The fat (at about 60° C.) is then poured into the bulb of the dilatometer and the ground glass stopper is inserted, care being taken not to include any air. The amount of fat added is such that, during the determination, the level of water never falls below the lowest of the graduations and never rises above the top of the graduations. If the initial water level on filling is about two thirds of the height of the graduated capillary, these conditions are usually fulfilled. The dilatometer is re-weighed to obtain the weight of fat added. The hollow stopper is then partly filled with lead shot. It is then placed in a water bath maintained at 60° C., (±0.1°) and a reading of the level of the water in the capillary is made. This is the "base reading," $R_{60}$.

The filled dilatometer is chilled in an ice/water bath for 1½ hrs. It is then allowed to warm in an air bath to 26° C. at which temperature it is maintained for 40 hrs. It is then again chilled in an ice/water bath for 1½ hrs. and then placed in a water bath at 20° C. (±0.1° C.), the dilatometer being immersed to such a depth that the water level is above the middle of the ground glass stopper.

The position of the water meniscus in the capillary is read every half hour until two successive readings differ by no more than 2 mm.³. The final reading ($R_t$) is used in the calculations.

A similar procedure is adopted for each temperature $t$ at which the dilatation is required. Thus, $R_{20}$, $R_{25}$, $R_{30}$ and $R_{35}$ are successively determined.

Finally the dilatometer is heated again to 60° C. and the "base reading" is re-determined. If the initial and final "base reading" differ by more than 2 mm.³ the whole operation must be repeated.

The calculation:

The value of the dilatation is calcuated from the following formula:

$$D_t = \frac{25(R_{60} - R_t)}{W} - A$$

where
$D_t$ = dilatation at $t°$ C.
$W$ = weight of fat taken
$R_{60}$ = base reading (mm.³)
$R_t$ = reading of the capillary at $t°$ C. (mm.³), and
$A$ is given in the table below

| $t°$ C. | A |
|---|---|
| 20 | 880 |
| 25 | 770 |
| 30 | 665 |
| 35 | 555 |

The following examples illustrate the invention:

EXAMPLE 1

(a) Preparation of catalyst 20 g. of a sample of good quality kieselguhr (93.1% ash) were added to 700 ml. of distilled water and the mixture brought to the boil. 15.4 ml. of 3.4 N pure sodium carbonate were added to this boiling solution, immediately followed by the simultaneous addition of a 10° aqueous solution of nickel nitrate ($Ni(NO_3)_2.6H_2O$) and 3.4 N sodium carbonate solution; these solutions were added at a rate of 2 mls. of each per minute, a total of 400 mls. of each solution being added. The reaction mixture was boiled continuously during the addition. The final mixture was filtered and the cake washed with hot water until the filtrate was neutral to phenolphthalein and gave no precipitate with barium chloride solution. The cake was removed from the filter dried at 110–120° C. and finely powdered.

9 g. of the cake was reduced under hydrogen at 500° C. for 75 minutes to give a pyrophoric catalyst which was transferred directly to 700 g. of melted palm oil of iodine value 53.8 which was to be hardened. The palm oil then contained 0.5% of nickel.

(b) Hydrogenation

The palm oil containing catalyst, prepared as above, was hydrogenated at atmospheric pressure at 100° C., with very rapid stirring, for 45 minutes. The oil was then filtered and found to have iodine value of 27.8.

(c) Fractionation (i) 350 g. of the hardened palm oil of iodine value 27.8 from (b) were dissolved in 3500 mls. of anhydrous acetone at 48° C. (In all the examples given in this specification all the acetone used was substantially anhydrous.) The solution was cooled with gentle stirring to 22° C., allowed to stand for 20 minutes and then filtered. The filter cake was washed with 300 mls. of acetone at 22° C. It was then removed from the filter and stirred with 700 mls. of acetone at 22° C., again filtered and the cake finally washed with 300 mls. of acetone at 22° C. The initial filtrate and the three wash liquors were combined and the acetone removed to give 182 g. of a fraction of iodine value 40.3. The solid filter cake was discarded.

(ii) 177 g. of the product of iodine value 40.3 from (i) were dissolved in 1770 mls. of acetone at 50° C. The solution was cooled with gentle stirring to 0° C., allowed to stand for 20 minutes and then filtered. The filter cake was washed with 300 mls. of acetone at 0° C. It was then removed from the filter and stirred with 500 mls. of acetone at 0° C., again filtered, and the cake finally washed with 300 mls. of acetone at 0° C. The filtrate and wash liquors were discarded. The filter cake, after removal of the acetone, consisted of 112 g. of a product of iodine value 32.4.

(iii) 111 g. of the product of iodine value 32.4 from (ii) were dissolved in 1110 mls. of acetone at 50° C. The solution was cooled with gentle stirring to 18° C., allowed to stand for 20 minutes and then filtered. The filter cake was washed with 200 mls. acetone at 18° C. After removal of the acetone from the combined initial filtrate and wash liquors, 79 g. of a product having an iodine value of 34.5 were obtained. This represents an overall yield of 23.4 percent. The solid filter cake was discarded.

The product had a dilatation at 20° C. of 1880 and a dilatation at 35° C. of 125.

EXAMPLE 2

(i) 401.5 g. of the hardened palm oil prepared in Example 1(b) were dissolved in 4015 mls. of anhydrous acetone at 48° C. The solution was cooled with gentle stirring at 18° C., allowed to stand for 20 minutes and then filtered. The filter cake was washed with 300 mls. of acetone at 18° C. It was then removed from the filter and stirred with 1000 mls. of acetone at 18° C., again filtered and the cake washed with 300 mls. of acetone at 18° C. The initial filtrate and the three wash liquors were combined and the acetone removed to give 193.5 g. of product. The solid filter cake was discarded.

(ii) The whole of the product from (i) was dissolved in 1935 mls. of acetone at 50° C. The solution was cooled with gentle stirring at 0° C., allowed to stand for 20 minutes and then filtered. The filter cake was washed with 300 mls. of acetone at 0° C. It was then removed from the filter and stirred with 700 mls. of acetone at 0° C., again filtered, and the cake finally washed with 300 mls. of acetone at 0° C. The filtrate and wash liquors were discarded. The filter cake after removal of acetone, consisted of 124.2 g. of product of iodine value 34.8.

(iii) 120 g. of the product of iodine value 34.8 from (ii) were dissolved in 1200 mls. of acetone at 49° C. The solution was cooled with gentle stirring at 16° C., allowed to stand for 20 minutes and then filtered. The filter cake was washed with 50 mls. of acetone at 16° C. After removal of acetone from the combined initial filtrate and wash liquor, 102 g. of product having an iodine value of 35.5 were obtained. This represents an overall yield of 26.3 percent. The solid filter cake was discarded.

The product had a dilatation at 20° C. of 1905 and a dilatation at 35° C. of 205.

EXAMPLE 3

(a) Preparation of catalyst 18 g. of catalyst cake prepared and reduced as described in example 1(a) was then transferred directly to 700 g. of melted palm oil of iodine value 53.8 which contained 0.4 g. of dissolved sulphur. This palm oil was hydrogenated at 180° C. with rapid stirring for 5 hours, the final product having an iodine value of 3.2.

The catalyst was then filtered from the oil and washed on the filter with two portions of 50 g. of melted palm oil of iodine value of 53.8. The catalyst cake, wet with palm oil, from the filter was then mixed with 700 g.

of the palm oil of iodine value 53.8. The palm oil then contained 1.0% nickel.

(b) Hydrogenation

The palm oil containing catalyst, prepared as above, was hydrogenated at atmospheric pressure at 180° C. with very rapid stirring for 1½ hours. The oil was then filtered and found to have an iodine value of 41.0.

(c) Fractionation (i) 370 g. of a hardened palm oil of iodine value 41.0 from (b) were dissolved in 3700 mls. of anhydrous acetone at 48° C. The solution was cooled with gentle stirring to 0° C., allowed to stand for 20 minutes and then filtered. The filter cake was washed with 300 mls. of acetone at 0° C., removed from the filter and stirred with 700 mls. acetone at 0° C., again filtered and the cake finally washed with 300 mls. of acetone at 0° C. The filtrate and wash liquors were discarded. The filter cake, after removal of acetone, consisted of 237 g. of a product of iodine value 33.3.

(ii) 218 g. of the product of iodine value 33.3 from (i) were dissolved in 2180 mls. of acetone at 50° C. The solution was cooled with gentle stirring at 25° C., allowed to stand for 20 minutes and then filtered. The filter cake was washed with 400 mls. of acetone at 25° C. The initial filtrate and wash liquors were combined and the acetone removed to give 136 g. of a product of iodine value 40.0. The solid filter cake was discarded.

(iii) 133 g. of the product of iodine value 40.0 from (ii) were dissolved in 1330 mls. of acetone at 50° C. The solution was cooled with gentle stirring to 0° C., allowed to stand for 20 minutes and then filtered. The filter cake was washed with 100 mls. of acetone at 0° C. It was then removed from the filter and stirred with 250 mls. of acetone at 0° C., again filtered and the filter cake finally washed with 100 mls. acetone at 0° C. The filtrate and wash liquors were discarded. The filter cake, after removal of acetone, consisted of 111 g. of a product of iodine value 37.8.

(iv) 102 g. of the product of iodine value 37.8 from (iii) was dissolved in 1020 mls. of acetone at 49° C. The solution was cooled to 20° C. with gentle stirring, allowed to stand for 20 minutes and then filtered. The filter cake was washed with 200 mls. of acetone at 20° C. The initial filtrate and the wash liquor were combined and the acetone removed to give 69.5 g. of a product having an iodine value of 40.0. This represents an overall yield of 22.6 percent. The solid filter cake was discarded.

The product had a dilatation at 20° C. of 2095 and a dilatation at 35° C. of 545.

EXAMPLE 4

Milk chocolates were made according to the general formula:

300 g. "milk refiner paste" (containing 76 g. cocoa-butter, 16 g. milk fat)
36 g. additional fat.

The bowl of an end runner mill was warmed to 40° C., the refiner paste was added and the additional fat added slowly, with warming. The chocolate mix was then warmed to 45-50° C. and maintained at this temperature for 2 hours. The mill was then stopped and the chocolate mix poured into a 9" porcelain evaporating dish. The mix was stirred in a manner such that the formation of air bubbles was minimised, until it became too stiff to stir easily. The chocolate mix was then again heated very gently to a point at which it was just pourable, care being taken to avoid overheating. The molten mix was poured into chilled (11-12° C.) moulds, any air bubbles being removed by vigorous tapping. The filled moulds were placed in a refrigerator at 11-12° C. After 48 hours the moulded bars of chocolate were removed from the moulds, stored at room temperature (19° C.) for 4 days and then examined.

Chocolates were made using the following additional fats:

(a) A mixture of 10.2 g. cocoa-butter and 25.8 g. of the product of Example 2(iii) having an iodine value of 35.5, a dilatation at 20° C. of 1905 and a dilatation at 35° C. of 205.

(b) A mixture of 10.2 g. cocoa-butter and 25.8 g. of the product of Example 3(iv) having an iodine value of 40.0, a dilatation at 20° C. of 2095 and a dilatation at 35° C. of 545.

We claim:

1. A process for preparing a cocoa-butter substitute from palm oil which comprises partly hardening palm oil and fractionating the partly hardened palm oil to obtain a fraction having an iodine value not greater than 45, a dilatation at 20° C. of not less than 1000 and a dilatation at 35° C. of not greater than 600.

2. A process for preparing a cocoa-butter substitute from palm oil which comprises partly hardening palm oil and fractionally crystallising the partly hardened palm oil from a solvent to obtain a fraction having an iodine value not greater than 45, a dilatation at 20° C. of not less than 1000 and a dilatation at 35° C. of not greater than 600.

3. A process for preparing a coca-butter substitute from palm oil which comprises partly hardening palm oil to an iodine value of not less than 25 and fractionally crystallising the partly hardened palm oil from a solvent to obtain a fraction having an iodine value not greater than 45, a dilatation at 20° C. of not less than 1000, and a dilatation at 35° C. of not greater than 600.

4. A process for preparing a cocoa-butter substitute from palm oil which comprises partly hardening palm oil to an iodine value of not less than 10 and fractionally crystallising the partly hardened palm oil from a solvent to obtain a fraction having an iodine value not greater than 45, a dilatation at 20° C. of not less than 1000, and a dilatation at 35° C. of not greater than 600.

5. A process for preparing a cocoa-butter substitute from palm oil according to claim 2 in which the fraction has a dilatation at 20° C. of not less than 1500.

6. A process for preparing a cocoa-butter substitute from palm oil according to claim 2 in which the fraction has a dilatation at 35° C. of not greater than 300.

7. A process for preparing a cocoa-butter substitute from palm oil according to claim 2 in which the fraction has an iodine value of not greater than 35.

8. A process for preparing a cocoa-butter substitute from palm oil which comprises partly hardening palm oil, fractionally crystallising the partly hardened palm oil from a solvent to obtain a fraction having an iodine value not greater than 35, a dilatation at 20° C. of not less than 1500 and a dilatation at 35° C. of not greater than 300.

9. A process for preparing a cocoa-buter substitute from palm oil according to claim 8 in which the fraction has a dilatation at 20° C. of not less than 1750.

10. A process for preparing a cocoa-butter substitute from palm oil according to claim 8 in which the fraction has a dilatation at 35° C. of not greater than 200.

11. A fat composition consisting essentially of a fraction of partially hardened palm oil and a fat from the group consisting of cocoa butter and Borneo tallow type fats, said fraction constituting from 25 to 80% by weight of the composition and having an iodine value of not greater than 45, a dilatation at 20° C. of not less than 1000, and a dilatation at 35° C. of not greater than 600.

12. The fat composition of claim 11, wherein said fraction has an iodine value of not greater than 35, a dilatation at 20° C. of not less than 1500, and a dilatation at 35° C. of not greater than 300.

13. The fat composition of claim 11, wherein said fraction has an iodine value of not greater than 35, a dilatation at 20° C. of not less than 1750, and a dilatation at 35° C. of not greater than 200.

14. A fat composition consisting essentially of a fraction of partially hardened palm oil and cocoa butter, said fraction constituting from 25 to 50% by weight of the composition and having an iodine value of not greater than 45, a dilatation at 20° C. of not less than 1000, and a dilatation at 35° C. of not greater than 600.

15. A fat composition consisting essentially of a fraction of partially hardened palm oil and a Borneo tallow type fat, said fraction having an iodine value of not greater than 45, a dilatation at 20° C. of not less than 1000, and a dilatation at 35° C. of not greater than 600, and said Borneo tallow type fat comprising not less than 20% and not more than 75% by weight of the fat mixture.

16. A chocolate composition consisting essentially of decorticated cocoa bean and an additional fat, the additional fat consisting essentially of a fraction of partially hardened palm oil and cocoa butter said fraction having an iodine value of not greater than 45, a dilatation at 20° C. of not less than 1000, and a dilatation at 35° C. of not greater than 600, and said fraction constituting from 25-50% by weight of the total fat in the composition.

17. A chocolate composition consisting essentially of decorticated cocoa bean, sweetening agent, milk fat and an additional fat, the additional fat consisting essentially of a fraction of partially hardened palm oil, and a fat selected from the group consisting of cocoa butter and Borneo tallow type fats, said fraction having an iodine value of not greater than 45, a dilatation at 20° C. of not less than 1000, and a dilatation at 35° C. of not greater than 600, the said additional fat comprising from 25-50% by weight of the total fat in the composition, exclusive of the milk fat, and the Borneo tallow type fat, when employed, comprising from 20-75% by weight of the additional fat.

18. A chocolate composition consisting essentially of decorticated cocoa bean, a sweetening agent and an additional fat, the additional fat consisting essentially of a fraction of partially hardened palm oil, and a fat selected from the group consisting of cocoa butter and Borneo tallow type fats, said fraction having an iodine value of not greater than 35, a dilatation at 20° C. of not less than 1750, and a dilatation at 35° C. of not greater than 200, and said additional fat comprising from 25-50% by weight of the total fat in the composition, and the Borneo tallow type fat, when employed, comprising from 20-75% by weight of the additional fat.

19. The confectionery product of claim 17 wherein a Borneo tallow type fat is present at a level of at least 20% based on the weight of the hardened palm oil fraction.

20. A chocolate composition consisting essentially of a sweetening agent, milk fat, cocoa buter, non-fat solids of decorticated cocoa beans, and a fraction of partially hardened palm oil, said fraction having an iodine value of not greater than 45, a dilatation at 20° C. of not less than 1000, and a dilatation at 35° C. of not greater than 600, and said fraction constituting from 25-50% by weight of the total fat in the composition, exclusive of the milk fat.

21. A chocolate composition, the fat component of which consists essentially of cocoa butter and a fraction of partially hardened palm oil, said fraction having an iodine value no greater than 45, a dilatation at 20° C. of not less than 1000, and a dilatation at 35° C. of not greater than 600, and said fraction constituting from 25-50% by weight of the fat component.

References Cited in the file of this patent

UNITED STATES PATENTS 2,586,615    Cross _____ Feb. 19, 1952

FOREIGN PATENTS 590,916    Great Britain _____ July 31, 1947

OTHER REFERENCES

Jensen: "The Chemistry, Flavoring and Manufacture of Chocolate Confectionary and Cocoa," 1931, pp. 181 to 207.

Bailey: "Industrial Oil and Fat Products," 2nd Edition, 1951, pp. 139 and 140.